(12) United States Patent
Hanelt et al.

(10) Patent No.: US 7,396,486 B2
(45) Date of Patent: Jul. 8, 2008

(54) POLYMERIZABLE MIXTURES

(75) Inventors: Eckhard Hanelt, Geltendorf (DE); Thilo Gebhard, München (DE); Markus Jandke, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 213 days.

(21) Appl. No.: 10/533,865

(22) PCT Filed: Oct. 30, 2003

(86) PCT No.: PCT/EP03/12083

§ 371 (c)(1), (2), (4) Date: Oct. 14, 2005

(87) PCT Pub. No.: WO2004/041966

PCT Pub. Date: May 21, 2004

(65) Prior Publication Data

US 2006/0097224 A1    May 11, 2006

(30) Foreign Application Priority Data

Nov. 7, 2002    (DE) .................. 102 51 861

(51) Int. Cl.
- *C09K 19/52* (2006.01)
- *C09K 19/38* (2006.01)
- *C09K 19/34* (2006.01)
- *C09K 19/12* (2006.01)
- *C09K 19/20* (2006.01)

(52) U.S. Cl. .............. 252/299.01; 252/299.5; 252/299.61; 252/299.62; 252/299.64; 252/299.65; 252/299.66; 252/299.67; 428/1.1; 428/1.3

(58) Field of Classification Search .......... 428/1.1, 428/1.3; 252/299.01, 299.5, 299.61, 299.62, 252/299.64, 299.65, 299.66, 299.67
See application file for complete search history.

(56) References Cited

U.S. PATENT DOCUMENTS

| | | | |
|---|---|---|---|
| 4,637,896 A | 1/1987 | Shannon | |
| 4,996,330 A | 2/1991 | Scherowsky et al. | |
| 5,188,760 A * | 2/1993 | Hikmet et al. | 252/299.01 |
| 5,204,763 A * | 4/1993 | Hikmet | 349/88 |
| 5,210,630 A * | 5/1993 | Heynderickx et al. | 349/183 |
| 5,235,443 A | 8/1993 | Barnik et al. | |
| 5,333,074 A * | 7/1994 | Hikmet | 349/88 |
| 5,599,412 A | 2/1997 | Faris | |
| 5,827,449 A | 10/1998 | Hanelt et al. | |
| 6,181,395 B1 | 1/2001 | Li et al. | |
| 6,218,578 B1 * | 4/2001 | Coates et al. | 568/61 |
| 6,423,246 B1 | 7/2002 | Kosch et al. | |
| 6,440,328 B1 | 8/2002 | Stanjek et al. | |
| 7,081,281 B2 * | 7/2006 | Kumai et al. | 428/1.1 |
| 7,083,834 B2 * | 8/2006 | Kuntz et al. | 428/1.1 |

FOREIGN PATENT DOCUMENTS

| | | |
|---|---|---|
| DE | 196 19 460 A1 | 11/1997 |
| DE | 198 35 730 A1 | 2/1999 |
| DE | 199 17 067 A1 | 10/2000 |
| DE | 199 22 158 A1 | 11/2000 |
| EP | 0 044 612 A1 | 1/1982 |
| EP | 0 060 335 A1 | 9/1982 |
| EP | 0 261 712 A1 | 3/1988 |
| EP | 0 302 619 A2 | 2/1989 |
| EP | 0 358 208 A2 | 3/1990 |
| EP | 0 451 905 A1 | 10/1991 |
| EP | 0 617 111 A1 | 3/1994 |
| EP | 0 601 483 A1 | 6/1994 |
| EP | 0 606 939 A1 | 7/1994 |
| EP | 0 606 940 A2 | 7/1994 |
| EP | 0 626 386 A1 | 11/1994 |
| EP | 0 631 157 A1 | 12/1994 |
| EP | 0 643 121 | 3/1995 |
| EP | 0 664 826 B1 | 8/1995 |
| EP | 0 685 749 A1 | 12/1995 |
| EP | 0 749 466 | 12/1995 |
| EP | 0 739 403 B1 | 10/1996 |
| EP | 0 875 525 A1 | 11/1998 |
| EP | 0 885 945 A1 | 12/1998 |
| EP | 1 046 692 A1 | 10/2000 |
| EP | 1 059 282 A1 | 12/2000 |
| WO | WO 95/24454 | 9/1995 |
| WO | WO 96/25470 | 8/1996 |
| WO | WO 97/23580 | 7/1997 |
| WO | WO 98/04651 | 2/1998 |

OTHER PUBLICATIONS

Derwent Abstract corresponding to DE 198 35 730 A1.

(Continued)

*Primary Examiner*—Shean C Wu
(74) *Attorney, Agent, or Firm*—Brooks Kushman P.C.

(57) ABSTRACT

A mixture which is polymerizable to polymers exhibiting a high optical anisotropy which is stable during polymerization. The mixture contains a first monomer or (and/or) oligomer having two or more polymerizable functional groups and optionally a mesogenic group; a second monomer or oligomer bearing at least one mesogenic group having an aromatic double ring structure and only one polymerizable group; and from 1 to 50% by weight of a monomer non-polymerizable with the first or second monomer, but which also contains a mesogenic group having an aromatic double ring structure.

20 Claims, 1 Drawing Sheet

OTHER PUBLICATIONS

EP 749466 is replaced by WO 95/24454.
Derwent Abstract corresponding to EP 0 739 403 B1.
Derwent Abstract corresponding to EP 0 664 826 B1.
Derwent Abstract corresponding to EP0 626 386 A1.
Derwent Abstract corresponding to EP 0 685 749 A1.
Derwent Abstract corresponding to EP 0 601 483 A1.
Derwent Abstract corresponding to EP 0 875 525 A1.
Derwent Abstract corresponding to EP 0 060 335 A1.
Derwent Abstract corresponding to EP 0 631 157 A1.
Derwent Abstract corresponding to EP 0 885 945 A1.
Derwent Abstract corresponding to EP 0 358 208 A2.
Maier et al., Eine einfache molekular-statistische Theorie der nematischen kristallinflüssigen Phase. Teil I, Z. Naturforschg., 1959, vol. 14a, pp. 882-889.
Maier et al., Eine einfache molekular-statistische Theorie der nematischen kristallinflüssigen Phase. Teil II, Z. Naturforschg., 1960, vol. 15a, pp. 287-292.
Broer et al., "In-situ photopolymerization of oriented liquid-crystalline acrylates, 5," Makromol. Chem. 192, 1991, pp. 50-74.
Portugall et al., "Synthesis and Phase Behaviour of Liquid Crystalline Polyacrylates," Makromol. Chem. 183, 1982, pp. 2311-2321.
Maurer et al., "Polarizing Collor Filters made from Cholesteric LC Silicones," SID International Symposium Digest of Technical Papers, vol. 21, Las Vegas 1990, pp. 110-113.
Finkelmann et al., "Synthesis of Cholesteric Liquid Crystalline Polymers," Makromol. Chem. 179, 1978, pp. 829-832.
Müller et al., "Birefringence of Compensated Cholesteric Liquid Crystals," Berichte Der Bunsen-Gesellschaft, vol. 77, No. 1, 1973, pp. 20-23.
Dreher, "Reflection Properties of Distorted Cholesteric Liquid Crystals," Solid State Communications, vol. 12, 1973, pp. 519-522.
Mazkedian et al., "On Light Defraction by Cholesteric Liquid Crystals with a Pitch Gradient," Journal De Physique, 1975, pp. C1-283-C1-287.
Hajdo et al., "Theory of Light Reflection by Cholesteric Liquid Crystals Possessing a Pitch Gradient," J. Opt. Soc. Am., vol. 69, No. 7, Jul. 1979, pp. 1017-1025.
Maurer et al., "Cholesteric Reflectors with a Color Pattern," SID International Symposium Digest of Technical Papers, vol. 25, 1994, Jun. 14-16, pp. 399-407.

* cited by examiner

Fig.1

POLYMERIZABLE MIXTURES

CROSS-REFERENCE TO RELATED APPLICATION

This application claims priority to PCT Appln. No. PCT/US03/012083 filed Oct. 30, 2003, and to German application 102 51 861.0 filed Nov. 7, 2002.

BACKGROUND OF THE INVENTION

1. Field of the Invention

The invention relates to polymerizable mixtures and optically anisotropic polymers which can be prepared therefrom.

2. Description of the Related Art

Low molecular weight nematic or smectic compounds can be readily oriented in thin layers in the temperature range of the liquid crystalline phase and then have an optical anisotropy by means of which polarized light can be influenced in a controlled manner. Technically, this effect is utilized, for example, in liquid crystal displays (LCDs), in which the brightness of individual pixels is changed by switching the orientation of the molecules by applying an electric field. By a suitable choice of compounds with high refractive index anisotropy $\Delta n$, optical delays of the order of magnitude of the wavelengths of visible light can be achieved in the case of layer thicknesses of a few μm. The optical anisotropy of these layers of low molecular weight liquid crystalline compounds is, however, stable only in a very limited temperature range, owing to the thermal motion of the molecules and the limited liquid crystalline phase region. In order to produce permanent layers having a defined optical anisotropy, which is also retained in the case of a temperature change, liquid crystalline compounds having polymerizable groups which are crosslinked by chemical reaction to give a polymer film are therefore used. Liquid crystalline side-chain polymers which are prepared from polymerizable nematic and smectic monomers and oligomers, as described, for example, in WO 96/25470, have proven particularly useful for this purpose.

For many applications, the degree of optical anisotropy $\Delta n$ is of key importance. Whereas, in the case of a pure retarder function, the total optical delay $\Delta n \cdot d$ can be established not only by the material parameter $\Delta n$ but also by the thickness d of a layer, this is no longer possible, for example, for the width $\Delta\lambda$ of a cholesteric reflection band since this is directly dependent on the birefringence $\Delta n$, because $\Delta\lambda/\lambda = \Delta n/n$ (where $\lambda$=middle wavelength of the cholesteric reflection band, n=mean refractive index of the material). The $\Delta n$ of the material can be varied within certain limits by a suitable choice of the chemical groups of the mesogens, but this choice is greatly limited from economic points of view. In particular, compounds having a high $\Delta n$, such as, for example, tolanes, require complicated syntheses and, owing to the excessively high costs, are scarcely suitable for applications requiring a large amount of material.

The optical anisotropy of a liquid crystal layer is determined both by the polarizability of the individual molecules in the frequency range of visible light and by the temperature-dependent order parameter of the ensemble of all molecules (W. Maier, A. Saupe, Z. Naturforsch., Part A 14, 882 (1959); ibid. 15, 287 (1960)). In the polymerization of the liquid crystal layer, a change of optical anisotropy can occur. Since the chemical structures of the mesogens scarcely differ before and after the polymerization, it may be assumed that the optical polarizability is also similar in both cases. The order parameter is mainly responsible for the change in the optical anisotropy. In order to avoid a reduction of the order parameter during polymerization, compounds in which the polymerizable groups are decoupled from the mesogenic backbone of the molecule by an alkyl spacer are therefore generally used in the liquid crystalline mixtures known to date for the production of optically anisotropic polymer films.

Particularly suitable liquid crystals are the mixtures which are described in WO 96/25470 and contain liquid crystalline monomers or oligomers having exactly one polymerizable group and which, for increasing the crosslinking density and hence the stability of the film, have additional components which carry at least two polymerizable groups. The polymerizable groups are generally not mesogenic and disturb the order of the liquid crystalline phase. In such mixtures, liquid crystalline compounds having only one polymerizable group are therefore preferable, to those having two polymerizable groups if the object is a polymer film having as high an optical anisotropy as possible.

For the polymer films, it must furthermore be ensured that the optical anisotropy of the oriented but still unpolymerized liquid crystalline mixture is retained even after the polymerization reaction. However, it is found that, in contrast to earlier investigations with liquid crystalline monomers which carry two polymerizable groups (D. J. Broer, G. N. Mol, Makromol. Chem. 192, 59 (1991)), the polymer films produced according to WO 96/25470 often have a lower optical anisotropy than the oriented layers of the same material before the polymerization reaction.

The prior art discloses polymerizable liquid crystalline mixtures which contain nonpolymerizable liquid crystalline components, which however do not give a homogeneous polymer film after the polymerization. In particular, these films are unsuitable or suitable only to a limited extent for applications for which a high $\Delta n$ is required. EP 451905 A describes anisotropic gels which are prepared from mixtures of polymerizable components with low molecular weight, liquid crystalline materials.

Characteristic of these gels is that the low molecular weight, liquid crystalline material forms a continuous phase around the polymer network. In these polymer-stabilized liquid crystalline gels, the low molecular weight, liquid crystalline components are still mobile and can be switched by the action of an external force, for example an electric field. However, they have no thermal and mechanical stability and are therefore not suitable as a stable optically anisotropic polymer film.

U.S. Pat. No. 6,181,395 B1 describes a film which is used as a broad-band circular polarizer. By segregation of an unpolymerizable liquid crystalline component in a polymerizable cholesteric material, it is intended to produce a nonlinear gradient of the composition perpendicular to the film surface, i.e. the films are not homogeneous. Nothing is stated concerning the mechanical stability and the optical anisotropy of the films. Apart from the given specific examples, no generally valid method is given as to how the LC material has to be selected in order to achieve the effect of a nonlinear pitch variation of the cholesteric reflection band, described in U.S. Pat. No. 6,181,395 B1. The resulting considerable broadening of the cholesteric reflection band is achieved independently of the value $\Delta\lambda/\lambda = \Delta n/n$ theoretically predetermined by the birefringence $\Delta n$. The LC mixtures used in the examples contain no aromatic double ring structures in the polymer moiety and are not suitable for ensuring a high optical anisotropy in the context of this invention in the polymer films.

SUMMARY OF THE INVENTION

It was the object of the present invention to provide a polymerizable mixture from which a stable polymer film having high optical anisotropy Δn can be produced by a synthesis which is as uncomplicated as possible. This and other objects are achieved by employing a polymerizable mixture of at least three components; a first monomer or oligomer bearing two polymerizable groups; a second monomer or oligomer with but one polymerizable group and at least one mesogenic group having an aromatic double ring structure; and a third compound having no reactive functionality polymerizable with the first and second monomers or oligomers, but also having a mesogenic group having an aromatic double ring structure.

DETAILED DESCRIPTION OF THE PREFERRED EMBODIMENT(S)

The invention relates to a polymerizable mixture (P) comprising
A) monomer or oligomer (A), each of the monomers or oligomers (A) having at least two polymerizable functional groups which are selected from (meth)acrylate ester, epoxy and vinyl ether groups,
B) liquid crystalline monomer or oligomer (B), each of the monomers or oligomers (B) having at least one mesogenic group having an aromatic double ring structure and exactly one polymerizable functional group, which is selected from (meth)acrylate ester, epoxy and vinyl ether groups,
C) from 1 to less than 50% by weight, based on the polymerizable mixture, of a monomer (C) which has at least one mesogenic group having an aromatic double ring structure and contains no group which can react with the polymerizable functional groups of the monomers or oligomers (A) and (B).

Surprisingly, the polymers prepared by polymerization of the mixture (P), in particular polymer films (F) thereof, exhibit up to 50% higher optical anisotropies than films of compositions known in the literature, in which the liquid crystalline monomers or oligomers have similar mesogenic groups, but contain in each case at least one polymerizable functional group, or in which the liquid crystalline monomers or oligomers have no aromatic double ring structures. The optical anisotropy Δn is preferably greater than 0.18 for nematic and preferably greater than 0.16 for cholesteric LC polymers and preferably changes by less than 10% in the case of a temperature change of from 0° C. to 80° C.

Surprisingly, it has been found that even small additions of nonpolymerizable liquid crystalline components (C) can significantly increase the optical anisotropy of a polymer film (F) produced from this LC mixture. This is also true in particular when the mesogenic groups of these components (C) have similar chemical structures and hence similar optical polarizabilities to the polymerizable components of the mixture. The mixture (P) preferably forms a homogeneous phase. The order of this homogeneous phase is preferably nematic, cholesteric or smectic. In the finished polymer film (F), the unpolymerized liquid crystalline components preferably do not constitute a separate continuous phase but are preferably homogeneously distributed in the network in order to ensure the homogeneity and the mechanical stability of the polymer film (F). The amount of the nonpolymerizable liquid crystalline monomers (C) in the mixture is therefore less than 50%. In the context of this invention, nonpolymerizable groups can also be functional groups, such as the allyl group, which, owing to their low reactivity for example in a mixture with (meth)acrylate ester, epoxy or vinyl ether groups, do not react or react only to a slight extent in a copolymerization. Preferably, the monomers (C) in the polymerizable mixture (P) contain no (meth)acrylate ester, epoxy, vinyl ether, thiol or other groups which participate in the polymerization or copolymerization. On the other hand, there are other liquid crystalline compounds, such as, for example, the thiol compounds which are described in WO 96/25470, which are not suitable as monomers of group (C) since they react with the (meth)acrylate ester, epoxy and vinyl ether groups. In WO 96/25470, these liquid crystalline thiol compounds are used for terminating the free radical polymerization and hence regulating the length of the polymer chains.

Those chemical groups which can give rise to liquid crystalline properties in a molecule are designated as mesogenic groups in the context of this invention. In principle, all mesogenic groups known in the literature are suitable for components (A), (B) and (C). A regularly updated collection of known mesogenic groups is published by V. Vill et al. as a database under the name LiqCryst (obtainable from LCI Publisher GmbH, Eichenstr. 3, D-20259 Hamburg). Preferably used mesogenic groups are those which are readily obtainable synthetically on an industrial scale and which give compounds which ensure a stability sufficient for use as polymer film (F) over a long period. Examples of these are chemical structural elements, such as carboxylic esters and alcohols based on phenyl, biphenyl, cyanobiphenyl, naphthyl and cyanonaphthyl derivatives and combinations of these groups.

Aromatic double ring structures in the context of this invention are two monocyclic aromatic groups which are directly linked by a single bond or bicyclic aromatic groups. Preferred aromatic double ring structures are two monocyclic groups in each case linked by a single bond, which are selected from 1,4-phenylene, 2,5-pyridinylene and 2,5-pyrenylene and the aromatic double rings 2,6-naphthylidene, 2,7-naphthylidene and 1,4-naphthylidene, it being possible for these aromatic double ring structures also to be substituted.

The monomers or oligomers (A) preferably have at least one mesogenic group and at least two polymerizable functional groups which are selected from (meth)acrylate ester, epoxy and vinyl ether.

Preferred oligomers (A) and (B) have a polymer backbone and mesogenic side groups.

Particularly preferred oligomers (A) and (B) are those which contain at least two identical or different units of the general formula (1)

in which, independently of one another, in each case either p=1 and q=2 or p=2 and q=1,
$R^1$ are identical or different $C_1$- to $C_{10}$-hydrocarbon radicals, such as the methyl, ethyl, n-propyl, n-butyl, n-pentyl, n-hexyl, n-heptyl, n-octyl, n-nonyl and n-decyl radical or the phenyl radical,
M are identical or different mesogenic side groups of the general formula (2)

in which
$R^2$ is a radical of the formula $(CH_2)_n$, in which n is an integer having a value from 2 to 10, it being possible for one or more, nonneighboring methylene units to be replaced by oxygen atoms or dimethylsilyl radicals, $R^3$ is a chemical bond or a radical of the formula $(CH_2)_m$, in which m is an integer having a value from 1 to 13, it being possible for one or more, nonneighboring methylene units to be replaced by oxygen atoms or dimethylsilyl radicals, $X^1$ is a chemical bond or is selected from divalent radicals of the group —O—, —COO— and —OCO—, $X^2$ are identical or different linking groups which, independently of one another, are selected from the group consisting of the chemical bond and divalent radicals of the group —COO—, —OCO—, —CH$_2$CH$_2$—, —CH=N—, —N=CH—, —N=N—, —CONH—, —HONC—, —C≡C—, —CH=CH—, —N=N(O)— and —N(O)=N—, $A^2$ are identical or different monocyclic groups which, independently of one another, are selected from divalent radicals of the group 1,4-phenylene, 1,4-cyclohexylene, 2,5-pyridinylene, 2,5-pyrenylene, 2,5-pyrimidinylene, 5,2-pyrimidinylene, 2,5-dioxanylene, 5,2-dioxanylene and the aromatic double rings 2,6-naphthylidene, 2,7-naphthylidene and 1,4-naphthylidene, it also being possible for these radicals to be substituted,

$A^1$ is a terminal group which is selected from the group consisting of the hydrogen atoms, halogen atoms, hydroxyl, nitrile, cyano, acryloyloxy, (meth)acryloyl and (meth)acryloylethyleneoxy radicals, epoxy, vinyl ether, cholestane radicals, cholesteryl radicals, doristeryl radicals, dianhydrohexityl radicals, tartrate radicals, phenyl radicals, cyclohexane radicals and the alkenyl radicals having 1 to 10 carbon atoms, in which one or more, nonneighboring methylene units can be replaced by oxygen atoms or dimethylsilyl radicals, and a may assume the values 2, 3 or 4.

Particularly preferred silicon-containing oligomers comprising units of the general formula (1) are cyclotetrasiloxane, cyclopentasiloxane, tetramethyldisiloxane and substituted linear polymethylsiloxanes having a preferred number of from 4 to 20 silicon atoms and preferably trimethylsilyl groups as terminal groups.

Methyl radicals are particularly preferred as radicals $R^1$.

Particularly preferred mesogenic side groups of the oligomers (A) and (B) are those of the general formula (3)

(3)

in which $R^5$ is an oxygen atom or an oxyalkyleneoxy radical having from 1 to 11 carbon atoms, in which one or more methylene units which are not adjacent to one another or to oxygen can be replaced by oxygen atoms, and $R^6$ is a hydrogen atom or a methyl radical.

Particularly preferred monomers (A) are compounds of the general formula (4)

(4)

in which $R^3$, $X^1$, $X^2$, $A^1$ and $A^2$ have the meanings stated for the general formula (2) and $R^7$ is selected from identical or different radicals of the group consisting of the acryloyloxy, methacryloyloxy and (meth)acryloylethyleneoxy radicals, epoxy and vinyl ether and b may assume the values 1, 2 or 3.

Particularly preferred monomers (B) are compounds of the general formula (5)

(5)

in which $R^3$, $X^1$, $X^2$, $A^1$, $A^2$ and a have the meanings stated for the general formula (2) and $R^8$ is selected from the group consisting of the acryloyloxy, methacryloyloxy and (meth)acryloylethyleneoxy radicals, epoxy and vinyl ether and from the group consisting of the alkyl radicals or alkenyl radicals having 1 to 10 carbon atoms, in which one or more, nonneighboring methylene units can be replaced by oxygen atoms or dimethylsilyl radicals.

Preferably, the polymerizable mixture (P) contains at least 5, in particular at least 10, % by weight and not more than 95, in particular not more than 80, % by weight of monomer or oligomer (A).

Preferably, the polymerizable mixture (P) contains at least 5, in particular at least 10, % by weight and not more than 95, in particular not more than 80, % by weight of liquid crystalline monomer or oligomer (B).

Particularly preferred liquid crystalline monomers (C) are compounds of the general formula (6)

(6)

in which $R^3$, $X^1$, $X^2$, $A^2$ and a have the meanings stated for the general formulae (1) and (2) and $R^9$ is a carboxyl radical or an alkyl or alkenyl radical having from 1 to 10 carbon atoms, in which one or more, nonneighboring methylene units can be replaced by oxygen atoms or dimethylsilyl radicals, and $A^3$ is selected from the group consisting of hydrogen atoms, halogen atoms, hydroxyl, nitrile, cyano and cholestane radicals, cholesteryl radicals, doristeryl radicals, dianhydrohexityl radicals, tartrate radicals, phenyl, cyclohexane radicals and alkenyl radicals having from 1 to 10 carbon atoms, in which one or more, nonneighboring methylene units can be replaced by oxygen atoms or dimethylsilyl radicals.

The polymerizable mixture (P) preferably contains at least 5, in particular at least 10, % by weight and not more than 40, in particular not more than 35, % by weight of monomer (C).

The polymerizable mixtures (P) can optionally contain chiral components (D) which have or do not have polymerizable functional groups. Particularly preferred chiral components (D) are compounds of the general formula (7):

(7)

in which $K^1$ is selected from the group consisting of the dianhydrohexitol derivatives and tartrate radicals and in particular dianhydrosorbide or dianhydromannitol, $R^{10}$, $R^{11}$, $R^{12}$ and $R^{13}$, independently of one another, have same meaning as $R^3$, $X^3$ and $X^5$, independently of one another, have the same meaning as $X^1$, $X^4$ and $X^6$, independently of one another, have the same meaning as $X^2$, $A^4$ and $A^6$, independently of one another, have the same meaning as $A^2$, $A^5$ and $A^7$ are identical or different radicals which are selected from the group consisting of hydrogen atoms, halogen atoms, hydroxyl, nitrile, cyano, acryloyloxy, methacryloyloxy and (meth)acryloylethyleneoxy radicals, epoxy, vinyl ether, phenyl and cyclohexane radicals and alkenyl radicals having from 1 to 10 carbon atoms, it being possible for one or more, nonneighboring methylene units to be replaced by oxygen atoms or dimethylsilyl radicals, and b and c, independently of one another, may assume the values 0, 1 or 2.

In a cholesteric mixture, the polymerizable mixture (P) contains preferably at least 0.1 and not more than 50, in particular not more than 20, % by weight of chiral component (D), depending on the HTP (helical twisting power) of the chiral component and on the desired reflection wavelength.

The components (A), (B), (C) and (D) can in each case be a compound or a mixture of compounds.

The polymerizable mixtures (P) can optionally contain further additives (E) which are selected from the group consisting of the initiators, inhibitors, accelerators, dyes, adhesion promoters and surface-active substances, in amounts by weight which do not hinder the formation of a liquid crystalline phase.

The polymerizable mixture (P) preferably contains at least 0.01 and not more than 10, in particular not more than 5, % by weight of additives (E).

The preparation of liquid crystalline monomers and oligomers is described in the literature.

Various continuous or batchwise processes for the preparation of optically anisotropic polymers (F) and in particular of optically anisotropic polymers films (F) from the polymerizable mixtures (P) are likewise known in principle. The polymerizable mixture (P) is applied to a substrate, oriented and then fixed by chemical reaction, in particular polymerization. Orientation is preferably effected in the temperature range of the liquid crystalline phase of the polymerizable mixture (P).

The application of the polymerizable mixtures (P) to the substrate surface can be carried out in solution or in the form of a solvent-free melt above the glass transition temperature of the mixture, for example by spin coating or with a doctor blade or a roll. If a solvent is used for the application, it must be removed in a subsequent drying step. The thickness of the dry LC layer on the substrate depends on the requirements of the respective application. If the polymer film (F) is to be used, for example, as a retarder plate, the necessary thickness is the quotient of the required optical retardation and optical anisotropy of the oriented LC layer. In the case of cholesteric LC polymers in which the polymerizable mixture (P) contains a chiral component, the layer thickness determines the number of turns of the cholesteric helix and hence the form of the reflection band. The thickness of the dry polymer films (F) is preferably from 0.5 µm to 500 µm, in particular from 1 µm to 50 µm. In the case of cholesteric polymer films (F), the layer thickness is particularly preferably more than three times the pitch of the cholesteric helix. The polymer film (F) can be prepared on a substrate as a layer open on one side or can be covered by a second substrate. The preparation of polymer films (F) open on one side by melt application from a solution is described, for example, in EP 358208 A and EP 617111 A. Various processes for the continuous and batchwise production of LC polymer films between two substrates are described, for example, in EP 601483 A and EP 631157 A. For improving the wetting of the substrate or the orientation of the mesogens on the open surface, the polymerizable mixtures (P) can, as shown in EP 617111 A, contain small amounts by weight of surface-active substances of additives (E), as known, for example, for improving the leveling, from the production of surface coatings. Particularly suitable surface-active substances are organosiloxanes, which are commercially available as coating assistants, for example from Wacker-Chemie GmbH. The organosiloxanes in the form of oligomers may themselves also have liquid crystalline properties. If the polymer film (F) is to remain on the substrate after the crosslinking, the adhesion to the substrate can, depending on the characteristics of the substrate surface, be improved by suitable adhesion promoters in the polymerizable mixture (P), which are likewise part of the prior art. An improvement in the adhesion of the polymer film (F) to the substrate can also be achieved by a suitable pretreatment of the substrate, for example a corona treatment. The additives (E), which themselves have no liquid crystalline properties, are added only in such a small amount that they do not adversely affect the formation of the liquid crystalline phase.

The orientation of the mesogens in the polymerizable mixture (P) is effected, for example, by shearing of the material during coating or during application of the second substrate or, for example, after the coating by the interaction of the mesogens with the appropriately selected substrate surface or surfaces or by an electric or magnetic field. This is preferably done in a temperature range from above the glass transition temperature or melting point to below the beginning of clarification of the respective polymerizable mixtures (P). In order to permit a simple industrial process, the composition of the polymerizable mixtures (P) is preferably adjusted so that the optimum orientation temperature is from 20° C. to 150° C.

If the orientation of the mesogens is to be effected by an interaction with the substrate surface or surfaces, a suitable orientation layer can be applied to the substrate or substrate surfaces by known coating, printing or dipping processes described in the literature, in order to improve the orienting effect. A surface structure promoting orientation can be obtained on the orientation layers or the substrates by additional treatment, for example rubbing. A position-dependent change of the orientation direction is possible, for example, by known methods for structuring an orientation layer in the µm to mm range by means of exposure to polarized UV light through a mask. Suitable methods for achieving an inclination between the mesogens of a liquid crystalline phase and their interfaces are likewise described in the literature, for example exposure to polarized UV light or application of inorganic materials by vapor deposition at an oblique angle. If the polymer film (F) produced from the polymerizable mixture (P) remains on the substrate after the production, suitable substrates are preferably those materials which are known for the production of optical elements. Particularly preferred substrates are those which are transparent or semitransparent in the wavelength range relevant for the respective application, such as many organic or inorganic substrates, or metallic substrates which reflect light. This restriction is not applicable if the polymer film (F) is detached from the substrate after the production. In this case, particularly preferred substrates are those which impart only slight adhesion on the surface. The substrates may be flat or curved. Particularly preferably used substrates are those which are mechanically stable at a temperature of the production, processing and use of the polymer film (F).

Glass or quartz plates, polymer films, such as, for example, polycarbonates, polysulfones, polyalkylene terephthalates, polyalkylene naphthalates or polyimides, and polished metal surfaces are very particularly preferred. If required, the substrate or substrates can be provided with an additional orientation aid, for example a layer of polyimide, polyamide, polyvinyl alcohol or a silica.

After orientation is complete, the polymerizable mixture (P) is polymerized or copolymerized. The components of the mixture, which have polymerizable functional groups selected from the group consisting of (meth)acrylate ester, epoxy and vinyl ether, are three-dimensionally crosslinked. This crosslinking can preferably be effected by means of free radicals, which are produced by peroxides, by UV light or by high-energy electromagnetic radiation or thermally. However, the crosslinking can also be effected by means of crosslinking agents containing hydrogen atoms bonded directly to silicon, under catalysis by platinum metal catalysts, or it can also be effected cationically or anionically. Particularly preferred is crosslinking by UV light, which is described in EP 358208 A. The resulting polymer film can be used together with the substrate in the form of a laminate, as a film open on one side or, after removal of the substrate or substrates, also as a free film.

A preferred embodiment of the resulting optically anisotropic polymer films (F) comprises optically anisotropic plates, which are also referred to in the following text as LC plates. These optically anisotropic plates can be produced by comminuting polymer films (F). EP 601483 A describes how pigments having a liquid crystalline structure with a chiral phase, which reflect colored light, can be prepared by detaching a polymerized cholesteric film from the substrate and then comminuting the raw lumps thus obtained. Thereafter, the pigments can be incorporated into a suitable binder system and applied to a substrate. DE 196 19 460 A describes how plates having refractive index anisotropy which is negative for visible light can be produced by a similar method and used. Equally, the polymer films (F) can also be comminuted to give optically anisotropic plates and then applied in a binder system to a substrate.

The polymer films (F) having high optical anisotropy can be used, for example, as described in the literature as optical retarder films for improving the properties of liquid crystal displays. Depending on the choice of the substrates and of the orientation layers and on the composition of the polymerizable mixtures (P), it is possible to achieve different forms of orientation, which can advantageously be used in liquid crystal displays, such as, for example, TN or STN displays. Examples of possible orientations of the mesogens in the polymer films (F) are homogeneous and planar orientation of all mesogens, a hybrid orientation in which the orientation of one surface relative to the opposite one changes continuously from planar to homeotropic, a completely homeotropic orientation of all mesogens or a planar orientation which is twisted around the normal to the surface and in which the mesogens are oriented, for example, by doping with a chiral substance or by orientation layers rotated relative to one another, similarly to a TN or STN cell.

By slight modification of the above-described process for the production of the optically anisotropic polymer films (F), further applications can be realized. For example, absorptive polarization filters can be produced if a polymerizable mixture (P) is used which, in addition to the components of the mixture which have polymerizable functional groups and the monomers which do not react in the polymerization or copolymerization, also contains dichroic dye molecules which have anisotropic absorption behavior and become oriented along the mesogens. The polymer films (F) are distinguished by the fact that, owing to their higher order parameter, they permit an improved contrast ratio between the two polarization states of light. Digital or analog optical storage media which are based on a local change in the refractive index can be produced by locally changing the orientation of the mesogenic groups before the crosslinking. This can be achieved, for example, by local UV crosslinking through a mask which is not transparent to UV radiation, if the orienting forces acting from outside or the temperature of the polymer films (F) is changed between the individual exposure steps, or by local heating of the polymer films (F), for example by a laser, or by local changing of the HTP of the chiral substance (D) present, for example by a UV-induced isomerization. Another possibility is the structuring of the orientation layer, as used, for example, in LCD preparation for the production of subpixels. The polymer films (F) are particularly suitable here since, for these optical storage media, high optical anisotropy is advantageous for improving the contrast between the recorded information units.

If the polymerizable mixture (P) contains additional components which induce a chiral nematic phase (chiral substances), the polymer films (F) can also be used for the production of polarization- and wavelength-selective optical filters or corresponding LC plates. In the nematic substance, the chiral substances produce either a right-handed or left-handed helical structure which reflects circularly polarized light with the same helicity. The central wavelength of the reflection band, which is referred to below as reflection wavelength $\lambda$, is proportional to the refractive index n and to the pitch of the helical structure, which decreases with increasing concentration of chiral substance. In addition, the reflection wavelength is dependent on the angle of observation. The relative width of the band $\Delta\lambda/\lambda$ is given by the relative optical anisotropy $\Delta n/n$ of the polymer film (F). In most cases known from the literature, $\Delta\lambda$ is between 5% and 15% of the reflection wavelength.

The literature discloses numerous chiral substances suitable for the polymerizable mixture (P). For left-handed helical materials, cholesterol compounds are often employed, which also provide good mesogenic properties in addition to chirality (cf. for example Makromol. Chem. 179, 829-832 (1978)). For example, the tartarimide derivatives disclosed in U.S. Pat. No. 4,996,330 and EP 626386 A are also suitable. A suitable right-handed helical steroid system which is based on cholest-8(14)-en-3-ol (doristerol) or derivatives thereof, is described in EP 664826 A. EP 739403 A and EP 749466 A disclose crosslinkable, monomeric hexitol derivatives or mixtures of monomeric hexitol derivatives with other liquid crystalline compounds, which are used as monomeric dopants for the production of cholesteric networks. U.S. Pat. No. 5,827,449 describes liquid crystal mixtures which contain liquid crystalline organosiloxanes and dianhydrohexitol derivatives as left-handed or right-handed helical chiral additives. Compounds from the group consisting of dianhydrosorbide, dianhydromannitol and dianhydroiditol are particularly suitable. Polymers films (F) and LC plates can be produced from such cholesteric polymerizable mixtures (P) with chiral additives by the process described above. An advantage of the polymer films (F) having high optical anisotropy is the greater width of the reflection band, which leads to an intensification of the reflection. If the concentration of the chiral substances is chosen so that the reflection wavelength of the cholesteric band is in the visible wavelength range, these polymer films (F) and LC plates are outstandingly suitable for decorative applications since particular color effects occur owing to the color impression dependent on the angle of view and owing to the metallic gloss. In applications in security printing and trademark protection, good protection against unauthorized copying is also achieved, owing to these color effects and the polarization. Other examples for applications in optics are filters (EP 302619 A) and optically imaging, wavelength- and polarization-selective elements for visible light to near UV (EP 631157 A). Possible application forms of the optical elements are, for example, beam splitters, mirrors and lenses.

At low concentration of the chiral substances, the polymer films (F) are particularly preferably suitable for the production of cholesteric filters which reflect circularly polarized light in the infrared region (IR). By using curved substrates, in particular the production of optically imaging, wavelength- and polarization-selective elements in the IR range is thus permitted. Those IR-reflecting polymer films (F) and LC plates which are transparent and colorless in the range of visible light are particularly preferred for many applications. For this purpose, the wavelength of the lower band edge is preferably above 750 nm. One use of these IR layers comprises, for example, machine-readable inscriptions or marks which are invisible to the human eye, for example security marks on printed securities or in trademark protection. In these applications, in particular the circular polarization of the reflected IR radiation is advantageous since this is a security feature which can be reproduced only with difficulty. Another application of the IR-reflecting polymer films (F) and LC plates comprises colorless and transparent layers for protection from heat radiation, for example heat insulation glazing of buildings or vehicles. Since as far as possible reflection of all heat radiation is important in this application, two layers with opposite directions of rotation of the cholesteric helix are preferably combined here in order to reflect left-handed and right-handed helical polarization. Cholesteric polymer films (F) having an IR reflection wavelength, whose reflection band has additionally been broadened in film production, for example by measures cited below for producing a varying pitch of the helical structure, are particularly preferably used for this application. In optical apparatuses which operate with polarized light, such as, for example, liquid crystal displays, cholesteric polymer films can advantageously be used as the circular polarizer for colored or white light. The polymer films (F) having high optical anisotropy are particularly suitable thereby since, owing to the greater bandwidth, they reflect more polarized light. U.S. Pat. No. 5,235,443 A demonstrates how a layer of cholesteric liquid crystal can be used for increasing the light efficiency of a projector by utilizing the selective reflection of circularly polarized light. By combination with a birefringent medium which retards both polarization states of light relative to one another by a quarter of the wavelength ($\lambda$/4 film), the production of linearly polarized light is also possible. Such a $\lambda$/4 film can also be realized by a polymer film (F) without chiral components (D). Further combinations of a plurality of cholesteric films which make it possible to establish the optical properties over a wide spectral range are described, for example, by R. Maurer et al. under the title "Polarizing Color Filters made from Cholesteric LC Silicones", SID International Symposium Digest of Technical Papers, Vol. 21, Las Vegas, 1990, pages 110-113. In the examples there, it is also shown, inter alia, how a plurality of layers having different pitch can be combined to produce a polarizer having a bandwidth of over 250 nm, which covers the entire visible spectral range of light. Such a combination can be used as a reflective linear polarizer for white light.

Theoretical considerations by R. Dreher, Solid State Communications, Vol. 12, 519 (1973), as well as S. Mazkedian, S. Melone, F. Rustichelli, J. Physique Colloq. 36, $C_1$-283 (1974) and L. E. Hajdo, A. C. Eringen, J. Opt. Soc. Am. 36, 1017 (1976) show that a helical layer structure whose pitch changes linearly over the thickness of the film also has the ability for reflecting circularly polarized light in a wide band range. Special processes for producing such a pitch gradient, which are also suitable for the polymer films (F), are described, for example, in EP 606940 A, EP 875525 A or EP 885945 A. The polymerizable mixture (P) has the advantages that from the outset it has a greater width of the reflection band from the outset owing to the higher optical anisotropy and that it forms a lower density of the polymeric network owing to the non-polymerizable components, which further promotes an additional broadening of the band by the above process. EP 606939 A describes how such a cholesteric film can be used in combination with a depolarizing scattering film for light amplification in an LCD. In order to adapt the form of the cholesteric band to the technical requirements in an LCD or other optical apparatuses, it may be expedient to combine a plurality of LC polymer films, individual ones of which may have a broadened reflection band.

Cholesteric liquid crystals are thermochromic in the unpolymerized state, i.e. the pitch of the helical molecular structure and hence the reflection wavelength change in the case of a temperature change in the region of the cholesteric phase. U.S. Pat. No. 4,637,896 and R. Maurer et al., "Cholesteric Reflectors with a Color Pattern", SID International Symposium Digest of Technical Papers, Vol. 25, San Jose, Jun. 14-16, 1994, pages 399-402, describe how this effect can be utilized for achieving extensive color structuring of an LC polymer film by exposing individual parts of the film to actinic light at different temperatures successively through a mask. If the temperature range of the liquid crystalline phase is sufficiently wide, color and polarization filters with red, green and blue pixels, which can be used, for example, as LCD color filters, can be produced in this manner. The polymer films (F) having high optical anisotropy are particularly suitable for this application since reflection bands up to 100 nm wide can thus be realized. This range of bandwidth is preferred for maximum brightness and color saturation of the individual color pixels in an LCD. In combination with a circular polarizer for white light of reverse helicity, such a structured color filter can moreover serve for further increasing the brightness of an LCD or other optical apparatuses which operate with polarized light. In some of the above-described applications of the polymer films (F), it is also possible to use a layer with LC plates instead of a cohesive film. In this way, the special optical effects can be applied with substantially less effort since the user can use conventional printing and coating technologies instead of himself carrying out the more complicated production of the polymer films (F), which requires an orientation and crosslinking process.

For this purpose, the LC plates comprising polymer film (F), as described, for example, in EP 601483 A or EP 685749 A, can be incorporated into a suitable binder system. The required properties of the binder systems, in particular the optical properties, depend on the intended use of the LC plates. In applications which utilize the polarization- and wavelength-selective reflection of LC plates which contain chiral additives, preferably used binders are those which are optically transparent in the range of the reflection wavelength. For applications which utilize the optical anisotropy in the range of visible light, binders which are colorless and transparent in the total visible range are preferred. For optical elements, binder systems whose mean refractive index after curing is similar to the mean refractive index of the LC plates are preferably used. For the production of durable layers which contain LC plates, preferably curable binder systems are suitable. For special applications, however, noncurable binders, such as, for example, oils and pastes, can also be used. Binder systems which change the physical properties of the LC plates only in a defined manner, if at all, are particularly preferred. Suitable binder systems are, for example, polymerizable resins (UP resins, silicone resins, epoxy resins), dispersions, solvent-containing finishes or water-based finishes and all transparent plastics, for example polyvinyl chloride, polymethyl methacrylate and polycarbonate. In addition to these isotropic binders, liquid crystalline systems can also be used as binders, for example liquid crystalline polymers or polymerizable liquid crystalline resins, and polymerizable LC silicones. For the production of a layer or of a film having special optical properties, the LC plates comprising polymer film (F) are stirred into a liquid binder. The orientation of the plates parallel to the surface of the layer takes place as in the case of coating with liquid crystalline colored pigments (cf. for example EP 601483 A) on application of a thin layer of the pigment-binder mixture to a substrate or on extrusion of the mixture. Depending on the requirements of the respective application and on the properties of the binder, the film can be detached from the substrate after curing. The applications of the LC plates comprising polymer film (F) as well as in the case of the polymer films (F) may be a phase retardation or a polarization- and wavelength-selective reflection of electromagnetic waves from the ultraviolet to the infrared range. An example of the use of the LC plates is the production of optically imaging, wavelength- and polarization-selective elements on curved substrates (EP 685749 A). The LC plates comprising polymer film (F) are particularly suitable for decorative purposes if the concentration of the chiral substances is chosen so that the reflection wavelength of the cholesteric band is in the visible wavelength range. In applications in security printing and trademark protection, the color impression dependent on the angle of view and the polarization of the reflected light are additional security features. On simultaneous use of LC plates having a left-handed and right-handed helical structure, three-dimensional prints can be produced (U.S. Pat. No. 5,599,412). The LC plates comprising polymer film (F) can be particularly advantageously used for the production of security marks for protection from forgeries of, for example, banknotes, printed securities, documents or in trademark protection, since they can generally be incorporated with relatively little effort into the printing or other coating processes already existing in the case of these applications. IR-reflecting LC plates, which are obtained with a low concentration of chiral substances, are preferably transparent and colorless for such applications in the range of visible light. The wavelength of the lower band edge of the reflection band is preferably above 750 nm. Such LC plates can be produced so that they are suitable for marks which are invisible to the human eye and, owing to their good reflection in the IR range, can be registered by apparatuses having IR detectors. In addition to the reflection wavelength, circular polarization of the reflected radiation can also be detected as an additional security feature. For this application, the CLC plates comprising polymer film (F) are applied, preferably in an IR-transparent binder, to a substrate to be marked.

The polymers (F) are suitable for use for various optical applications, such as wavelength-selective optical elements for electromagnetic radiation, optical elements with phase retardation for electromagnetic radiation and polarization-selective optical elements for electromagnetic radiation, which can also be used in liquid crystal display apparatuses.

Wavelength-selective optical elements for electromagnetic radiation from the near ultraviolet to the infrared range can be produced using optically anisotropic polymer films (F) or plates thereof, the polymerizable mixtures (P) containing at least one chiral component or at least one dye. Optical elements with phase retardation for electromagnetic radiation and polarization-selective optical elements for electromagnetic radiation can be produced using optically anisotropic polymers films (F) or plates thereof.

It is possible to produce liquid crystal display apparatuses which comprise optically anisotropic polymer films (F) or plates thereof or at least one optical element which was produced using optically anisotropic polymers (F). These are in particular liquid crystal apparatuses comprising a liquid crystalline material arranged between two electrodes, optionally further optical components, such as light source, mirror, polarizers, retarder or color filter, and at least one film for producing an optical retardation or at least one film for generating or increasing the yield of polarized light or at least one film for the selection of colored light, these retarder films or polarization films or color filters being produced using optically anisotropic polymers (F).

EXAMPLES

In these examples, all stated amounts and percentages are based on weight, unless stated otherwise. The components of the mixture which are used in the examples and their syntheses are known from the prior art. Specifically, the following were prepared and used:

M.1: A compound having two polymerizable groups hydroquinone bis(4-(4-acryloylbutoxy)benzoate) (EP 261712 A) was prepared by the process from EP 1059282 A. The temperature range of the nematic phase is between 93° C. and 162° C.

M.2: Liquid crystalline compounds having one polymerizable group were prepared as described in M. Portugall et al., Macromol. Chem. 183 (1982) 2311.

M.2.1: 4'-Biphenyl 4-acryloylbenzoate having a nematic phase between 133° C. and 171° C. (supercoolable to 104° C.)

M.2.2: 4"-Biphenyl 4-(4'-acryloylbutoxy)benzoate according to U.S. Pat. No. 4,293,435, example 1.2.4, having a supercoolable nematic phase between 66° C. and 93° C. (supercoolable to 104° C.)

M.2.3: 4''-Cyanobiphenyl 4-(4'-acryloylbutoxy)benzoate having a nematic phase between 122° C. and 219° C. (supercoolable to 90° C.)

M.2.4: 6-Cyanonaphth-2-yl 4-(acryloyloxybutoxy)benzoate having a nematic phase between 111° C. and 130° C. (supercoolable to 25° C.)

M.3: Mesogenic compounds which contain no groups which polymerize with the compounds from M.1 and M.2 were prepared by a process described in EP 60335 A.

M.3.1: 4'-Biphenyl 4-allyloxybenzoate having a nematic phase between 139° C. and 142° C. (supercoolable to 129° C.)

M.3.2: 4'-Cyanobiphenyl 4-allyloxybenzoate according to EP 446912 A, having a nematic phase from 105° C. to above 260° C. (supercoolable to 80° C.)

M.3.3: 4'-Cyanobiphenyl 4-butoxybenzoate having a nematic phase from 121° C. to above 270° C. (supercoolable to 101° C.)

M.3.4: 6-Cyanonaphth-2-yl 4-allyloxybenzoate having a nematic phase between 145° C. and 188° C. (supercoolable to M.3.5: 4'-Methoxyphenyl 4-allyloxybenzoate having a melting point at 88° C. (supercoolable nematic phase from the melting point to 82° C.)

M.4: Polymerizable chiral substance 2,5-bis[4-[(1-oxo-2-propenyl)oxy]benzoate]-1,4:3,6-dianhydro-D-glucitol according to EP 1046692 A1

Example 1

As part of the investigations for example 1, inter alia time-resolved measurements in which the decrease in the optical anisotropy during the polymerization could be directly monitored were carried out.

a) 1.45 g (30%) of the compound hydroquinone bis(4-acryloylbutoxy)benzoate (M.1), 0.97 g (20%) of the compound 4'-biphenyl 4-acryloylbenzoate (M.2.1), 2.37 g (49%) of the compound 4'-biphenyl 4-allyloxybenzoate (M.3.1), 50 mg (1%) of photoinitiator 2-methyl-1-[4-(methylthio)phenyl]-2-morpholinopropan-1-one (available as Irgacure® 907 from Ciba Spezialitatenchemie GmbH, Lampertsheim) and 10 mg (0.2%) of stabilizer 2,6-di-tert-butyl-4-methylphenol (BHT) were stirred in the form of a melt at 120° C. until a homogeneous mixture was present (mixture 1a). Two glass plates were each provided with a polyvinyl alcohol orientation layer, which was rubbed unidirectionally with a velvet cloth. 5 mg of a nematic LC mixture 1a were applied at 120° C. to the orientation layer of one of the glass plates and covered with a second plate so that the rubbing directions were opposite and parallel. By uniform pressure on the plates with the use of glass spacers, the mixture was distributed until a film about 10 µm thick remained between the orientation layers. The film was heated for a few minutes at 120° C. until it was completely clear.

The optical anisotropy of this film was determined with the aid of the Sénarmont method at the light wavelength 633 nm. The measuring apparatus consists of an He—Ne laser and, in the beam direction, a Glan-Thompson prism as a polarizer, the sample, which is kept at a temperature of 120° C. in a microscope heating stage, a λ/4 plate, a further Glan-Thompson prism, rotatable about the beam axis, as an analyzer, and a photodiode. In order to achieve the highest possible sensitivity, the analyzer angle relative to the sample is set so that the transmission of the laser beam through the arrangement is minimal. The laser beam is timed by a rotating diaphragm. The transmission is electronically recorded via the current of the photodiode, which is connected to a lock-in amplifier. In this way, changes in the optical anisotropy can be monitored as a function of time.

2 200 nm was measured as the optical retardation of the uncrosslinked film, which corresponds to an optical anisotropy of Δn=0.208 at a subsequently determined film thickness of 10.6 µm. The sample was then exposed to UV-A light (about 20 mW/cm²) with continuous measurement. In the course of a few seconds, the diode current increased slightly from 2.1 nA to 2.5 nA and then remained constant. The corresponding Δn change is less than 1% and hence smaller than the measurement error for the absolute value of the optical anisotropy, which is about 3%. The exact thickness of the crosslinked film at the measuring spot was then determined on the basis of the interferences in thin films in a UV-VIS spectrometer (Lambda 19 from Perkin-Elmer). The optical anisotropy Δn of a second, completely crosslinked sample of the LC polymer mixture 1a was additionally measured directly using a prism coupler (Metricon Model 2010), which likewise contains an He—Ne laser having a wavelength of 633 nm. For this purpose, one of the glass plates was detached from the LC layer after the UV exposure. The measured value Δn=0.212 agrees with the value from the Sénarmont method within the measurement error.

b) Not according to the invention 3 g (60%) of hydroquinone bis(4-acryloylbutoxy)benzoate (M.1), 2 g (40%) of 4'-biphenyl 4-acryloylbenzoate (M.2.1), 50 mg (1%) of photoinitiator Irgacure® 907 and 10 mg (0.2%) of stabilizer BHT were stirred in the form of a melt at 120° C. until a homogeneous mixture was present (mixture 1b). Two glass plates were each provided with a polyvinyl alcohol orientation layer, which was rubbed unidirectionally with a velvet cloth. 5 mg of the nematic LC mixture 1b were applied at 120° C. to the orientation layer of one of the glass plates and covered with a second plate so that the rubbing directions were opposite and parallel. By uniform pressure on the plates, the mixture was distributed until a film about 10 µm thick remained between the orientation layers. The film was heated for a few minutes at 120° C. until it was completely clear.

Figure 1:
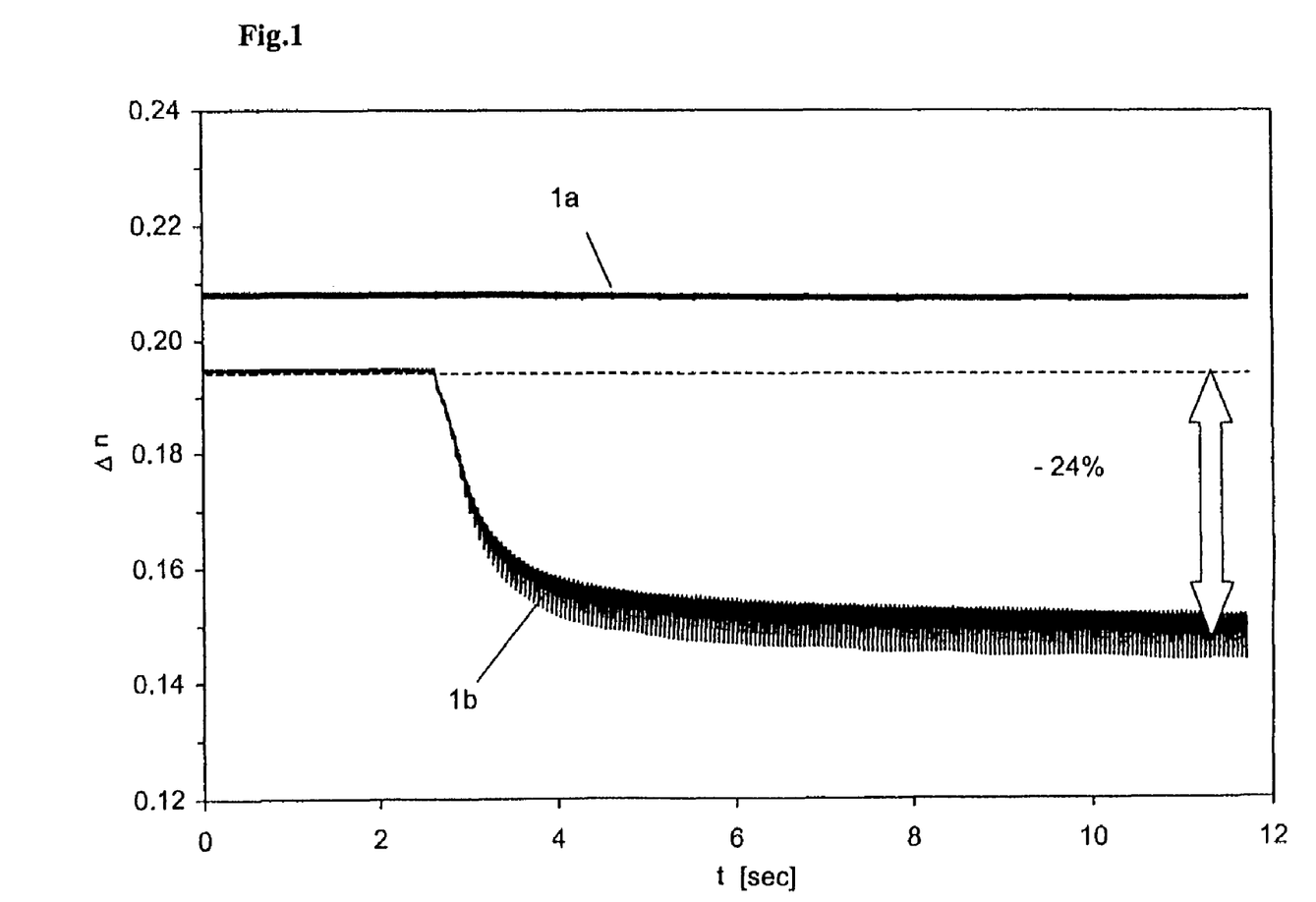
FIG. 1 illustrates the stability of Δn during polymerization of a mixture in accordance with the present invention.

The optical retardation was determined as in example a) with the aid of the Sénarmont method. For the uncrosslinked film, 2 130 nm was measured, which corresponds to an optical anisotropy of Δn=0.195 at a subsequently determined film thickness of 10.9 µm. The sample was then exposed to UV-A light as in example a) with continuous measurement (starting point in FIG. 1 at about 3 sec). In the course of a few seconds, the diode current increased sharply and then remained constant. The optical retardation of the sample at the end was 1 620 nm with Δn=0.149. This measured value was subsequently verified by a direct measurement of the Δn in the prism coupler. The thickness of the crosslinked film at the measuring spot was determined on the basis of interferences in thin films in the UV-VIS spectrometer. In FIG. 1, the optical anisotropy Δn derived from the diode current is plotted as a function of time and compared with the corresponding curve of example 1a). While the curve for 1a) remains virtually constant, a decease in Δn by 24% is observed in the case of 1b).

c) Not according to the invention 1.45 g (30%) of the compound hydroquinone bis(4-acryloylbutoxy)benzoate (M.1), 0.97 g (20%) of the compound 4'-biphenyl 4-acryloylbenzoate (M.2.1), 2.37 g (49%) of the compound 4'-methoxyphenyl 4-allyloxybenzoate (M.3.5), 50 mg (1%) of photoinitiator Irgacure® 907 and 10 mg (0.2%) of stabilizer BHT were stirred in the form of a melt at 120° C. until a homogeneous mixture was present (mixture 1c). Two glass plates were each provided with a polyvinyl alcohol orientation layer, which was rubbed unidirectionally with a velvet cloth. An oriented film was produced between two glass plates having orientation layers of rubbed polyvinyl alcohol, from 5 mg of the nematic LC mixture 1c), as in example a). The film was heated for a few minutes at 90° C. until it was completely clear. The optical retardation was determined with the aid of the Sénarmont method. For the uncrosslinked film, 1 890 nm was measured, which corresponds to an optical anisotropy of Δn=0.173 at a subsequently determined film thickness of 10.9 µm. The sample was then exposed to UV-A light as in example a) with continuous measurement. In the course of a few seconds, the diode current increased sharply and then remained constant. The optical retardation of the sample at the end was 1 780 nm with Δn=0.163. This measured value Δn was additionally verified in the prism coupler.

d) 2.1 g (42%) of hydroquinone bis(4-acryloylbutoxy)benzoate (M.1), 1.4 g (28%) of 4'-biphenyl 4-acryloylbenzoate (M.2.1), 1.5 g (30%) of 4'-biphenyl 4-allyloxybenzoate (M.3.1), 50 mg of photoinitiator Irgacure® 907 and 10 mg of stabilizer BHT were stirred in the form of a melt at 120° C. until a homogeneous mixture was present (mixture 1d). A sample thereof was oriented between glass plates and crosslinked, as in example 1a). After removal of one of the glass plates, the optical anisotropy Δn was measured directly at 633 nm using a prism coupler (Metricon Model 2010). The result, Δn=0.183, was 23% above the value of the crosslinked LC polymer mixture 1b). The mechanical properties of the LC polymer films produced were tested with the aid of a nanoindenter apparatus (NanoTest 600 from Micro Materials). For this purpose, a series of mixtures was prepared from (1−x)·60% of hydroquinone bis(4-acryloylbutoxy)benzoate (M.1), (1−x)·40% of 4'-biphenyl 4-acryloylbenzoate (M.2.1), (x·100%) of 4'-biphenyl 4-allyloxybenzoate (M.3.1) and in each case 1% of photoinitiator Irgacure® 907 and 0.2% of stabilizer BHT. The mixtures were stirred in the form of a melt at 120° C. until they were homogeneous, and small samples thereof were oriented as in example 1a) between glass plates and crosslinked by exposure to a UV lamp. One of the glass plates was then detached.

The hardness of the open polymer film was measured using a Berkovitch diamond tip, which was pressed about 1 µm into the approximately 11 µm film during the measurements. Table 1 shows the hardness H at room temperature as a function of the amount by weight x of the nonpolymerizable component 4'-biphenyl 4-allyloxybenzoate. Up to an amount of about 30% of 4'-biphenyl 4-allyloxybenzoate, the hardness remains virtually constant. Above this, the hardness and the mechanical stability of the polymer films decrease sharply, indicating a structural change. In the polarization microscope, it is observed that the material composition of the films with over 50% of 4'-biphenyl 4-allyloxybenzoate becomes inhomogeneous at room temperature since fractions of unpolymerized components begin to crystallize out. For the polymer films (F), an amount of from 30% to not more than 40% of 4'-biphenyl 4-allyloxybenzoate is therefore preferred in the case of this special LC mixture.

TABLE 1

Hardness of the polymer films from example 1d) at room temperature as a function of the amount by weight x of 4'-biphenyl 4-allyloxybenzoate

| x | Hardness |
|---|---|
| 0% | 0.22 |
| 30% | 0.19 |
| 40% | 0.12 |
| 49% | 0.10 |
| 60% | 0.10 |

Example 2

2.1 g (42%) of hydroquinone bis(4-acryloylbutoxy)benzoate (M.1), 1.4 g (28%) of 4'-biphenyl 4-acryloylbenzoate (M.2.1), 1.5 g (30%) of 4'-cyanobiphenyl 4-butoxybenzoate (M.3.3), 50 mg of photoinitiator Irgacure® 819 (Ciba Spezialitätenchemie GmbH, Lampertsheim) and 10 mg of stabilizer BHT were stirred in the form of a melt at 120° C. until a homogeneous mixture was present (mixture 2). As in example 1a), 5 mg of this nematic LC mixture were applied between two glass plates provided with orientation layers and were distributed until a film about 10 µm thick remained. The film was heated for a few minutes at 120° C. until it was completely clear and then crosslinked by means of UV-A light (about 100 mW/cm²) After removal of one of the glass plates, the optical anisotropy Δn was measured directly at 633 nm using a prism coupler (Metricon Model 2010). The result, Δn=0.196, was 32% above the value of the crosslinked LC polymer mixture 1b).

Example 3

1.5 g (30%) of hydroquinone bis(4-acryloylbutoxy)benzoate (M.1), 1.75 g (35%) of 4"-biphenyl 4-(4'-acrylbutoxy)benzoate (M.2.2), 1.75 g (35%) of 4'-biphenyl 4-allyloxybenzoate (M.3.1), 50 mg of photoinitiator Irgacure® 907 and 10 mg of stabilizer BHT were stirred in the form of a melt at 120° C. until a homogeneous mixture was present (mixture 3). As in example 1a), 5 mg of this nematic LC mixture were applied between two glass plates provided with orientation layers and were distributed until a film about 10 µm thick remained. The film was heated for a few minutes at 90° C. until it was completely clear. The optical retardation at 633 nm was determined as described above with the aid of the Sénarmont method. For the uncrosslinked film, 2190 nm was measured, which corresponds to an optical anisotropy of Δn=0.201 at a film thickness of 10.9 µm, determined subsequently in the UV-VIS spectrometer. During the exposure to UV-A light, the optical anisotropy decreased slightly to a final value of Δn=0.193.

Example 4 a) 685 mg (30%) of hydroquinone bis(4-acryloylbutoxy)benzoate (M.1), 804 mg (35%) of 4"-biphenyl 4-(4'-acrylbutoxy)benzoate (M.2.2), 806 mg (35%) of the 4'-biphenyl 4-allyloxybenzoate (M.3.1), 23 mg of photoinitiator Irgacure® 819 (Ciba Spezialitätenchemie GmbH, Lampertsheim) and 6 mg of stabilizer BHT were stirred in the form of a melt at 140° C. until a homogeneous mixture was present (mixture 4a). As in example 1a, 5 mg of this nematic LC mixture were applied between two glass plates provided with orientation layers and were distributed until a film about 10 μm thick remained. The film was heated for a few minutes at 90° C. until it was completely clear and then crosslinked using UV-A light (about 100 mW/cm$^2$). After one of the glass plates had been detached, the optical anisotropy of the LC polymer film was measured using a prism coupler (Metricon Model 2010), with the result that Δn=0.211 at 633 nm.

b) (Not according to the invention) For comparison, a polymer film was prepared in the same manner from 1.056 g (50%) of hydroquinone bis(4-acryloylbutoxy)benzoate (M.1), 1.058 g (50%) of 4"-biphenyl 4-(4'-acryloylbutoxy) benzoate (M.2.2), 22 mg of photoinitiator Irgacure® 819 and 4 mg of stabilizer BHT. The optical anisotropy of the sample oriented and crosslinked at 90° C. was Δn=0.171, said anisotropy being measured at 633 nm using the prism coupler.

Example 5 a) 740 mg (30%) of hydroquinone bis(4-acryloylbutoxy) benzoate (M.1), 868 mg (35%) of 4"-cyanobiphenyl 4-(4'-acryloylbutoxy)benzoate (M.2.3), 865 mg (35%) of 4'-cyanobiphenyl 4-allyloxybenzoate (M.3.2), 25 mg of photoinitiator Irgacure® 819 and 4 mg of stabilizer BHT were stirred in the form of a melt at 150° C. until a homogeneous mixture was present (mixture 5a). As in example 1a), 5 mg of this nematic LC mixture were applied between two glass plates provided with orientation layers and were distributed until a film about 10 μm thick remained. The film was heated for a few minutes at 150° C. until it was completely clear and then crosslinked using UV-A light (about 100 mW/cm$^2$). After one of the glass plates had been detached, the optical anisotropy of the LC polymer film was measured using a prism coupler (Metricon Model 2010), with the result Δn=0.248 at 633 nm.

b) (Not according to the invention) For comparison, a polymer film was prepared in the same manner from 740 mg (74%) of hydroquinone bis(4-acryloylbutoxy)benzoate (M.1), 248 mg (25%) of 4"-cyanobiphenyl 4-(4'-acryloylbutoxy)benzoate (M.2.3), 10 mg of photoinitiator Irgacure® 819 and 3 mg of stabilizer BHT. The optical anisotropy of the sample oriented and crosslinked at 90° C. was Δn=0.177, said anisotropy being measured at 633 nm using the prism coupler.

Example 6 a) 660 mg (30%) of hydroquinone bis(4-acryloylbutoxy) benzoate (M.1), 770 mg (35%) of 6-cyanonaphth-2-yl 4-(acryloylbutoxy)benzoate (M.2.4), 771 mg (35%) of 6-cyanonaphth-2-yl 4-allyloxybenzoate (M.3.4), 23 mg of photoinitiator Irgacure® 819 and 5 mg of stabilizer BHT were stirred in the form of a melt at 140° C. until a homogeneous mixture was present (mixture 6a). As in example 1), 5 mg of this nematic LC mixture were applied between two glass plates provided with orientation layers and were distributed until a film about 10 μm thick remained. The film was heated for a few minutes at 130° C. until it was completely clear and then crosslinked using UV-A light (about 100 mW/cm$^2$). After one of the glass plates had been detached, the optical anisotropy of the LC polymer film was measured using a prism coupler (Metricon Model 2010), with the result Δn=0.225 at 633 nm.

b) (Not according to the invention) For comparison, a polymer film was prepared in the same manner from 1.01 g (50%) of hydroquinone bis(4-acryloylbutoxy)benzoate (M.1), 1.02 g (50%) of 6-cyanonaphth-2-yl 4-(acryloylbutoxy)benzoate (M.2.4), 21 mg of photoinitiator Irgacure® 819 and 5 mg of stabilizer BHT. The optical anisotropy of the sample oriented and crosslinked at 110° C. was Δn=0.178, said anisotropy being measured at 633 nm using the prism coupler.

Example 7

626 mg (31%) of hydroquinone bis(4-acryloylbutoxy)benzoate (M.1), 606 mg (30%) of 4"-biphenyl 4-(4'-acryloylbutoxy)benzoate (M.2.2), 607 mg (30%) of 4'-cyanobiphenyl 4-butoxybenzoate (M.3.3), 162 mg (8%) of 2,5-bis[4-[(1-oxo-2-propenyl)oxy]benzoate]-1,4:3,6-dianhydro-D-glucitol, 21 mg of photoinitiator Irgacure® 819 and 4 mg of stabilizer BHT were stirred in the form of a melt at 100° C. until a homogeneous mixture was present (mixture 7a). As in example 1a), 5 mg of this cholesteric LC mixture were applied between two glass plates provided with orientation layers and were distributed until a film about 10 μm thick remained. The film was heated for a few minutes at 100° C. until it was completely clear and then crosslinked using UV-A light (about 100 mW/cm$^2$). When viewed perpendicularly in daylight, the film had a blue color. After one of the glass plates had been detached, the optical anisotropy of the LC polymer film was measured using the prism coupler. The evaluation of this measurement according to W. U. Müller and H. Stegemeyer, Berichte der Bunsen-Gesellschaft 77/1, page 20 (1973), gave Δn=0.191 at 633 nm for the anisotropy of an individual nematic layer in the cholesteric structure.

Example 8 a) 1.72 g (31.5%) of hydroquinone bis(4-acryloylbutoxy) benzoate (M.1), 2.45 g (45%) of 4"-biphenyl 4-(4'-acryloylbutoxy)benzoate (M.2.2), 0.74 g (13.5%) of 4'-biphenyl 4-allyloxybenzoate (M.3.1), 420 mg of (7.8%) of 2,5-bis(4-[(1-oxo-2-propenyl)oxy]benzoate)-1,4:3,6-dianhydro-D-glucitol, 110 mg of photoinitiator Irgacure® 819, 12 mg of stabilizer BHT and 5 mg of silicone oil AF98/300 (available from Wacker Chemie GmbH, Munich) were dissolved in a solvent mixture comprising 14.7 g of tetrahydrofuran (THF) and 1.6 g of toluene (mixture 8a). This solution was applied by spin coating to a polyethylene terephthalate film (PET) and dried so that a film about 5 μm thick remained. The film was heated for 10 minutes at 90° C. until it was completely clear and then crosslinked using UV-A light (about 100 mW/cm$^2$). When viewed perpendicularly in daylight, the film had a blue color. The measurement of the transmission in a UV-VIS spectrometer (Lambda 19 from Perkin-Elmer) gave a virtually box-like band at 475 nm with a full width at half height of 50 nm. The measurement of the optical anisotropy of the LC polymer film using the prism coupler and evaluation as in example 7 gave Δn=0.161 at 633 nm for the anisotropy of an individual nematic layer in the cholesteric structure.

b) As in example a), a polymer film was produced from a solution of 1.74 g (31.8%) of hydroquinone bis(4-acryloylbutoxy)benzoate (M.1), 2.15 g (45.5%) of 4"-biphenyl 4-(4'-acryloylbutoxy)benzoate (M.2.2), 0.745 g (13.6%) of 4'-biphenyl 4-allyloxybenzoate (M.3.1), 375 mg (6.8%) of 2,5-bis [4-[(1-oxo-2-propenyl)oxy]benzoate]-1,4:3,6-dianhydro-D-glucitol, 112 mg of photoinitiator Irgacure® 819, 11 mg of stabilizer BHT and 5 mg of silicone oil AF98/300 in a solvent mixture comprising 14.7 g of tetrahydrofuran (THF) and 1.6 g of toluene (mixture 8b). When viewed perpendicularly, the film reflected green light at 543 nm with a full width at half height of 60 nm. The measurement of the optical anisotropy of an individual nematic layer in the cholesteric structure was Δn=0.163 at 633 nm.

c) As in example a), a polymer film was produced from a solution of 1.71 g (32.1%) of hydroquinone bis(4-acryloylbutoxy)benzoate (M.1), 2.44 g (45.9%) of 4"-biphenyl 4-(4'-acryloylbutoxy)benzoate (M.2.2), 0.748 g (13.8%) of 4'-biphenyl 4-allyloxybenzoate (M.3.1), 325 mg (5.9%) of 2,5-bis[4-[(1-oxo-2-propenyl)oxy]benzoate]-1,4:3,6-dianhydro-D-glucitol, 108 mg of photoinitiator Irgacure® 819, 11 mg of stabilizer BHT and 5 mg of silicone oil AF98/300 in a solvent mixture comprising 14.3 g of tetrahydrofuran (THF) and 1.5 g of toluene (mixture 8b). When viewed perpendicularly, the film reflected yellow light at 610 nm with a full width at half height of 70 nm. The measurement of the optical anisotropy of an individual nematic layer in the cholesteric structure was $\Delta n=0.168$ at 633 nm.

d) As in example a), a polymer film was produced from a solution of 1.72 g (32.4%) of hydroquinone bis(4-acryloylbutoxy)benzoate (M.1), 2.46 g (46.3%) of 4"-biphenyl 4-(4'-acryloylbutoxy)benzoate (M.2.2), 0.738 g (13.9%) of 4'-biphenyl 4-allyloxybenzoate (M.3.1), 278 mg (5.2%) of 2,5-bis[4-[(1-oxo-2-propenyl)oxy]benzoate]-1,4:3,6-dianhydro-D-glucitol, 107 mg of photoinitiator Irgacure® 819, 12 mg of stabilizer BHT and 5 mg of silicone oil AF98/300 in a solvent mixture comprising 14.6 g of tetrahydrofuran (THF) and 1.6 g of toluene (mixture 8b). When viewed perpendicularly, the film reflected yellow light at 720 nm with a full width at half height of 90 nm. The measurement of the optical anisotropy of an individual nematic layer in the cholesteric structure was $\Delta n=0.172$ at 633 nm.

e) The mixture 8b) was applied to the polymer film from example 8a) by spin coating and was dried so that a film about 5 µm thick remained. The film was heated for 10 minutes at 90° C. until it was clear and then crosslinked using UV-A light (about 100 mW/cm$^2$). The mixture 8c) was then applied by spin coating and was dried so that a third film about 5 µm thick remained. The film was heated for 10 minutes at 90° C. until it was clear and then crosslinked using UV-A light (about 100 mW/cm$^2$). Thereafter, the mixture 8d) was applied by spin coating and was dried so that a fourth film about 5 µm thick remained. The film was heated for 10 minutes at 90° C. until it was clear and then crosslinked using UV-A light (about 100 mW/cm$^2$). The measurement of the transmission of this polymer film comprising four layers in the UV-VIS spectrometer gave a virtually box-like band from 450 nm to 770 nm. The light transmitted by the film is left-handed circular-polarized. For assessing the transmission, the LC polymer film, a retarder film having a λ/4 property and a linear polarizer in 45° orientation to the axis of the λ/4 film were placed on a commercial backlight for LC displays and compared with an arrangement comprising LCD backlight with linear polarizer without LC polymer film. It was found that, with a perpendicular direction of view, the brightness of the arrangement with LC polymer film is 35% brighter than without an LC polymer film.

The invention claimed is:

1. A polymerizable mixture (P) comprising
    A) at least one monomer or oligomer (A), each monomer or oligomer (A) having at least two polymerizable functional groups selected from the group consisting of (meth)acrylate ester, epoxy, and vinyl ether groups,
    B) at least one liquid crystalline monomer or oligomer (B), each monomer or oligomer (B) having at least one mesogenic group having an aromatic double ring structure, and having a single polymerizable functional group selected from the group consisting of (meth)acrylate ester, epoxy, and vinyl ether groups,
    C) from 1 to less than 50% by weight, based on the weight of the polymerizable mixture, of one or more monomers (C) which have at least one mesogenic group having an aromatic double ring structure and contain no group which reacts substantially with the polymerizable functional groups of the monomers or oligomers (A) and (B) during polymerization of said polymerizable mixture, said mixture, when polymerized, forming a stable polymer film.

2. The mixture of claim 1, in which the aromatic double ring structures are selected from the group consisting of a) two monocyclic groups each of which are linked by a single bond and are selected from the group consisting of unsubstituted and substituted 1,4-phenylene, 2,5-pyridinylene, and 2,5-pyrenylene, b) aromatic double rings selected from the group consisting of unsubstituted and substituted 2,6-naphthylidene, 2,7-naphthylidene and 1,4-naphthylidene, and c) mixtures thereof.

3. The mixture of claim 1, wherein the mesogenic groups comprise carboxylic esters and alcohols based on phenyl, biphenyl, cyanobiphenyl, naphthyl and cyanonaphthyl derivatives, or combinations of these groups.

4. The mixture of claim 2, wherein the mesogenic groups comprise carboxylic esters and alcohols based on phenyl, biphenyl, cyanobiphenyl, naphthyl and cyanonaphthyl derivatives, or combinations of these groups.

5. The mixture of claim 1, wherein the monomers or oligomers (A) have at least one mesogenic group.

6. The mixture of claim 2, wherein the monomers or oligomers (A) have at least one mesogenic group.

7. The mixture of claim 3, wherein the monomers or oligomers (A) have at least one mesogenic group.

8. The mixture of claim 1, which contains from 5 to 95% by weight of monomer or oligomer (A).

9. The mixture of claim 1, which contains from 5 to 95% by weight of liquid crystalline monomer or oligomer (B).

10. An optically anisotropic polymer (F), prepared by polymerizing the polymerizable mixture (P) of claim 1.

11. An optically anisotropic polymer (F), prepared by polymerizing the polymerizable mixture (P) of claim 2.

12. An optically anisotropic polymer (F), prepared by polymerizing the polymerizable mixture (P) of claim 3.

13. An optically anisotropic polymer (F), prepared by polymerizing the polymerizable mixture (P) of claim 5.

14. The polymer (F) of claim 10 which is a nematic polymer in which the optical anisotropy Δn is greater than 0.18.

15. The optically anisotropic polymer (F) of claim 10 which is a cholesteric polymer (F) in which the optical anisotropy Δn is greater than 0.16.

16. A process for the preparation of an optically anisotropic polymer (F) comprising applying a polymerizable mixture (P) of claim 1 to a substrate, orienting the mixture, and a polymerizing the polymerizable mixture.

17. A process for the preparation of an optically anisotropic polymer (F) comprising applying a polymerizable mixture (P) of claim 2 to a substrate, orienting the mixture, and a polymerizing the polymerizable mixture.

18. A process for the preparation of an optically anisotropic polymer (F) comprising applying a polymerizable mixture (P) of claim 3 to a substrate, orienting the mixture, and a polymerizing the polymerizable mixture.

19. A process for the preparation of an optically anisotropic polymer (F) comprising applying a polymerizable mixture (P) of claim 5 to a substrate, orienting the mixture, and a polymerizing the polymerizable mixture.

20. The polymer film of claim 11, which has a hardness greater than 0.12 measured using a Berkovitch diamond tip.

* * * * *

UNITED STATES PATENT AND TRADEMARK OFFICE
CERTIFICATE OF CORRECTION

PATENT NO. : 7,396,486 B2 Page 1 of 1
APPLICATION NO. : 10/533865
DATED : July 8, 2008
INVENTOR(S) : Eckhard Hanelt et al.

It is certified that error appears in the above-identified patent and that said Letters Patent is hereby corrected as shown below:

Column 24, Line 64, Claim 20:

Delete "firm".

Signed and Sealed this

Second Day of December, 2008

JON W. DUDAS
*Director of the United States Patent and Trademark Office*